United States Patent
Gervais et al.

(10) Patent No.: US 10,191,546 B2
(45) Date of Patent: Jan. 29, 2019

(54) HAPTIC THEME FRAMEWORK

(75) Inventors: Eric Gervais, Montreal (CA); Robert Heubel, San Leandro, CA (US)

(73) Assignee: IMMERSION CORPORATION, San Jose, CA (US)

(*) Notice: Subject to any disclaimer, the term of this patent is extended or adjusted under 35 U.S.C. 154(b) by 930 days.

(21) Appl. No.: 13/164,182

(22) Filed: Jun. 20, 2011

(65) Prior Publication Data

US 2012/0319938 A1 Dec. 20, 2012

(51) Int. Cl.
G09G 5/00 (2006.01)
G06F 3/01 (2006.01)

(52) U.S. Cl.
CPC .................. G06F 3/016 (2013.01)

(58) Field of Classification Search
CPC ........ G06F 3/011; G06F 3/016; G06F 9/4443; G06F 2203/014
USPC ............................. 715/702; 463/30; 345/174
See application file for complete search history.

(56) References Cited

U.S. PATENT DOCUMENTS

| | | | | |
|---|---|---|---|---|
| 5,905,492 | A * | 5/1999 | Straub et al. .................. | 715/744 |
| 6,424,356 | B2 | 7/2002 | Chang et al. | |
| 6,448,977 | B1 * | 9/2002 | Braun et al. ................... | 715/701 |
| 6,831,970 | B1 * | 12/2004 | Awada et al. ............ | 379/201.01 |
| 7,093,198 | B1 * | 8/2006 | Paatero et al. ................. | 715/746 |
| 7,486,273 | B1 * | 2/2009 | Aviles et al. .................. | 345/156 |
| 7,801,569 | B1 * | 9/2010 | Zellner .......................... | 455/567 |
| 8,621,348 | B2 * | 12/2013 | Ramsay et al. ............... | 715/702 |
| 2002/0054086 | A1 * | 5/2002 | Van Oostenbrugge et al. ............. 345/744 | |
| 2004/0085294 | A1 * | 5/2004 | Michelitsch et al. ......... | 345/156 |
| 2006/0055582 | A1 * | 3/2006 | Wendt ........................... | 341/175 |
| 2006/0066569 | A1 * | 3/2006 | Eid et al. ...................... | 345/156 |
| 2006/0288137 | A1 * | 12/2006 | Grant et al. ..................... | 710/62 |
| 2007/0005790 | A1 * | 1/2007 | Chang et al. ................. | 709/231 |
| 2007/0279392 | A1 * | 12/2007 | Rosenberg et al. ........... | 345/173 |
| 2007/0283273 | A1 * | 12/2007 | Woods .......................... | 715/738 |
| 2008/0028327 | A1 | 1/2008 | Hirota et al. | |

(Continued)

FOREIGN PATENT DOCUMENTS

JP 2007215051 A 8/2007
JP 2008-033560 A 2/2008

(Continued)

OTHER PUBLICATIONS

Okamura et al.; "Reality-Based Models for Vibration Feedback in Virtual Environments;" Sep. 2001; IEEE/ASME Transactions on Mechatronics; vol. 6, No. 3; pp. 245-252.*

(Continued)

*Primary Examiner* — Amare Mengistu
*Assistant Examiner* — Crystal A Mathews
(74) *Attorney, Agent, or Firm* — Miles & Stockbridge P.C.

(57) ABSTRACT

A haptic theme system is provided that can create a haptic theme, where a haptic theme is an installable package that includes one or more haptic effects, and a mapping of the one or more haptic effects to one or more user interface ("UI") events of a device. The haptic theme can be installed on the device, and the device can then dynamically load and play a haptic theme in real-time. The haptic theme system can display one or more haptic themes within a user interface. Upon receiving a selection, the haptic theme system can generate haptic feedback based on the haptic effect that is mapped to a received user interface event within the mapping.

14 Claims, 10 Drawing Sheets

(56) References Cited

U.S. PATENT DOCUMENTS

| | | | |
|---|---|---|---|
| 2008/0092057 A1* | 4/2008 | Monson et al. | 715/744 |
| 2008/0153554 A1* | 6/2008 | Yoon et al. | 455/567 |
| 2008/0163282 A1* | 7/2008 | Reponen et al. | 725/9 |
| 2008/0186152 A1 | 8/2008 | Kyung et al. | |
| 2008/0204266 A1* | 8/2008 | Malmberg et al. | 340/683 |
| 2008/0294984 A1* | 11/2008 | Ramsay et al. | 715/702 |
| 2009/0163182 A1* | 6/2009 | Gatti et al. | 455/414.1 |
| 2009/0231276 A1* | 9/2009 | Ullrich et al. | 345/157 |
| 2009/0313550 A1* | 12/2009 | Kim et al. | 715/744 |
| 2010/0011300 A1* | 1/2010 | AlHusseini et al. | 715/747 |
| 2010/0013653 A1* | 1/2010 | Birnbaum et al. | 340/669 |
| 2010/0013761 A1* | 1/2010 | Birnbaum et al. | 345/156 |
| 2010/0017759 A1* | 1/2010 | Birnbaum et al. | 715/863 |
| 2010/0156818 A1* | 6/2010 | Burrough et al. | 345/173 |
| 2010/0231539 A1* | 9/2010 | Cruz-Hernandez et al. | 345/173 |
| 2010/0278512 A1* | 11/2010 | Ryu et al. | 386/239 |
| 2010/0287311 A1* | 11/2010 | Cruz-Hernandez et al. | 710/6 |
| 2011/0010433 A1* | 1/2011 | Wilburn et al. | 709/219 |
| 2011/0061017 A1 | 3/2011 | Ullrich et al. | |
| 2011/0102340 A1* | 5/2011 | Martin et al. | 345/173 |
| 2011/0254670 A1* | 10/2011 | Han et al. | 340/407.1 |
| 2011/0271183 A1* | 11/2011 | Bose et al. | 715/702 |
| 2011/0314390 A1* | 12/2011 | Park et al. | 715/752 |
| 2012/0237043 A1* | 9/2012 | Radivojevic et al. | 381/58 |
| 2012/0249462 A1* | 10/2012 | Flanagan et al. | 345/173 |
| 2012/0249474 A1* | 10/2012 | Pratt et al. | 345/174 |

FOREIGN PATENT DOCUMENTS

| | | |
|---|---|---|
| JP | 2011081679 A | 4/2011 |
| WO | 2011031575 A2 | 3/2011 |

OTHER PUBLICATIONS

Okamura et al.; "Improving Reality-Based Models for Vibration Feedback;" 2000; American Society of Mechanical Engineers, Dynamic Systems and Control Division; vol. 69, No. 2; pp. 1117-1124.*

Seo et al.; "K-HapticModeler™: A Haptic Modeling Scope and Basic Framework;" Oct. 12-14, 2007; IEEE International Workshop on Haptic Audio Visual Environments and their Applications; pp. 136-141.*

Jeha Ryu and Hyungon Kim; "A Haptic Modeling System;" Apr. 1, 2010; InTech Publisher; Advances in Haptics, Chapter 18; pp. 357-374; Available from: http://www.intechopen.com/books/advances-in-haptics/a-haptic-modeling-system.*

Zhou et al.; "XML-based Representation of Haptic Information;" Oct. 1-2, 2005; IEEE International Workshop on Haptic Audio Visual Environments and their Applications; pp. 116-120.*

Lee et al.; "Development of K-Touch™ Haptic API for Various Datasets;" 2006; pp. 1-5.*

Nokia, "Nokia N8 Specifications," http://europe.nokia.com/find-products/devices/nokia-n8/specifications (last visited on Aug. 25, 2011).

NokiaPhones, "Changing Themes on Nokia N8," http://www.nokiaphones.net/changing-themes-on-nokia-n8/ (last visited on Aug. 25, 2011).

* cited by examiner

HAPTIC THEME FRAMEWORK

FIELD

One embodiment is directed generally to a device, and more particularly, to haptic effects for a device.

BACKGROUND

Haptics is a tactile and force feedback technology that takes advantage of a user's sense of touch by applying haptic feedback effects (i.e., haptic effects), such as forces, vibrations, and motions, to the user. Devices, such as mobile devices, touchscreen devices, and personal computers can be configured to generate haptic effects. In general, original equipment manufacturers ("OEMs") of such devices program calls to embedded hardware capable of generating haptic effects (such as actuators) within an operating system ("OS") of the device. These calls specify which haptic effect to play in response to a specific event. For example, when a user interacts with the device using, for example, a button, touchscreen, lever, joystick, wheel, or some other control, control position information can be sent to the OS of the device, which can then send a play command through control circuitry to the embedded hardware. The embedded hardware then produces the appropriate haptic effect. Because calls to the embedded hardware are generally programmed at the OS level, non-OEM parties can typically only utilize haptic effects that are already defined.

SUMMARY

One embodiment is directed to a computer-readable medium having instructions stored thereon that, when executed by a processor, cause the processor to create a haptic theme. The instructions include creating one or more haptic effects, creating a mapping that maps the one or more haptic effects to one or more user interface events using a mapping language, and packaging the mapping and the one or more haptic effects within the haptic theme.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

One embodiment is a haptic theme system that can create a haptic theme, where a haptic theme is an installable package that includes one or more haptic effects, and a mapping of the one or more haptic effects to one or more user interface ("UI") events of a device. The haptic theme can be installed on the device, and the device can then dynamically load and play a haptic theme in real-time. Furthermore, the device can transfer one or more haptic themes, or one or more haptic theme components, to another device, where a haptic theme component is at least a portion of a haptic theme. In addition, the device can analyze and capture one or more physical properties and apply the one or more physical properties as a haptic theme component within the device.

Figure 1:
FIG. 1 illustrates a perspective view of a device in accordance with one embodiment of the invention.

FIG. 1 illustrates a perspective view of a device 50 in accordance with one embodiment of the invention. Device 50, as illustrated in FIG. 1, is a mobile phone. However, device 50, in other embodiments, can be any type of device, such as a personal digital assistant ("PDA"), portable media player, portable gaming device, mobile phone, smartphone, tablet personal computer, or other similar device. Device 50 includes a UI 60 that allows a user to interface with a software application executing on device 50. Device 50 further includes a haptic theme system (not shown), described in further detail below, that can create one or more haptic themes for device 50.

As previously described, a haptic theme is a software packaging structure that contains one or more haptic effects and a mapping of the one or more haptic effects to one or more UI events of device 50. In one embodiment, the haptic theme is an installable package that can be installed on a device, such as device 50. In another embodiment, the haptic theme is a package that is integrated with an OS of a device, such as device 50. As also previously described, a haptic effect is a haptic feedback effect, such as a force, vibration, and motion, and a UI event is an interaction between a user of device 50 and UI 60 of device 50, such as the user touching a screen or a button of device 50, such as UI 60 displaying a progress bar to the user, and such as device 50 receiving an incoming message and producing an alert that is displayed to the user within UI 60. In one embodiment, the haptic theme system can also cause device 50 to transfer one or more haptic themes, or one or more haptic theme components, to another device. As also previously described, a haptic theme component is at least a portion of a haptic theme, such as a haptic effect, a mapping of a haptic effect to a UI event, or a combination therein. In another embodiment, the haptic theme system can also cause device 50 to analyze and capture one or more physical properties and convert one or more physical properties into a haptic theme component. In one embodiment, the one or more physical properties may include one or more physical properties of an object. Examples of such objects include a wooden surface, a stone surface, a metal surface, and a fabric surface, that each include unique physical properties, and that each produce a unique tactile haptic effect when touched. In another embodiment, the one or more physical properties may include one or more physical properties of an action produced by a device. An example of an action is a vibration of a telephone, such as a rotary telephone, when the telephone rings. The vibration produced by the telephone includes unique physical properties, and also produces a unique force haptic effect.

Figure 2:
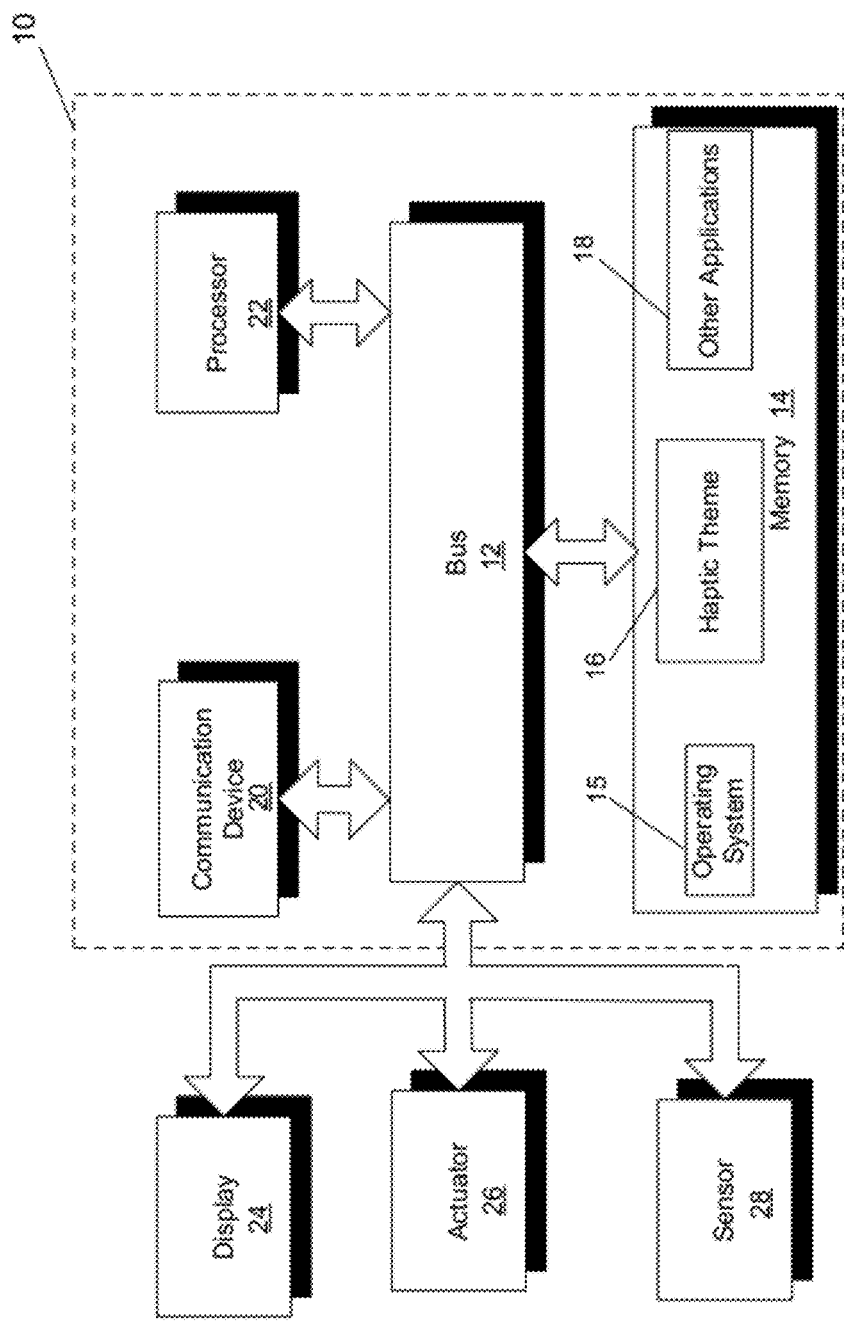
FIG. 2 illustrates a block diagram of a haptic theme system in accordance with one embodiment of the invention.

FIG. 2 illustrates a block diagram of a haptic theme system 10 in accordance with one embodiment of the invention. In one embodiment, system 10 is part of mobile device 50 of FIG. 1, and system 10 provides the haptic theme functionality. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer-readable medium.

A computer-readable medium may be any available medium that can be accessed by processor 22 and may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of an information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of a storage medium known in the art.

In one embodiment, memory 14 stores software modules that provide functionality when executed by processor 22. The modules include an operating system 15 that provides operating system functionality for system 10, as well as the rest of device 50 in one embodiment. The modules further include a haptic theme module 16 that provides a framework for creating one or more haptic themes, transferring one or more haptic themes, or one or more haptic theme components, and analyzing and capturing one or more physical properties and converting the one or more physical properties into a haptic theme component, as disclosed in more detail below. System 10 will typically include one or more additional application modules 18 to include additional functionality, such as applications to create one or more haptic effects.

System 10, in embodiments that transmit and/or receive data from remote sources, further includes a communication device 20, such as a network interface card, to provide mobile wireless network communication, such as infrared, radio, Wi-Fi, or cellular network communication. In other embodiments, communication device 20 provides a wired network connection, such as an Ethernet connection or a modem.

Processor 22 is further coupled via bus 12 to a display 24, such as a Liquid Crystal Display ("LCD"), for displaying a graphical representation or user interface to a user. The display 24 may be a touch-sensitive input device, such as a touch screen, configured to send and receive signals from processor 22, and may be a multi-touch touch screen.

System 10 further includes one or more actuators 26. Processor 22 may transmit a haptic signal associated with a haptic effect to actuator 26, which in turn outputs haptic effects. Actuator 26 may be, for example, an electric motor, an electro-magnetic actuator, a voice coil, a piezoelectric actuator, a shape memory alloy, an electro-active polymer, a solenoid, an eccentric rotating mass motor ("ERM") or a linear resonant actuator ("LRA").

System 10 further includes one or more sensors 28. Sensors 28 may include an accelerometer, a gyroscope, a Global Positioning System ("GPS") sensor, a touch-sensitive input device (e.g., touch screen, touchpad), a texture stylus, an imaging sensor, or some other type of sensor. Sensors 28 may be configured to detect one or more stimuli, such as one or more physical properties. Examples of physical properties can include changes in acceleration, inclination, inertia, pressure, or location. Sensors 28 may also include a location sensor, rotary velocity sensor, light sensor, pressure sensor, texture sensor, camera, microphone, or other type of sensor.

In one embodiment, a haptic theme framework provided by a haptic theme module (such as haptic theme module 16 of FIG. 2) can decouple a mapping of a haptic effect to a UI event from an OS of a device, and can allow a developer of a haptic theme to provide customized mappings between haptic effects and UI events, where the haptic theme can communicate the customized mappings to the OS of the device. A user of the device can subsequently acquire the haptic theme, for example, by downloading the haptic theme, and install the haptic theme on the device. Through this haptic theme framework, haptic effects can be plugged in, or plugged out, of the device, and can be mapped to different UI events. A user can install as many haptic themes on the device as desired, where each haptic theme can include a distinct mapping of haptic effects to UI events, and a user can select which haptic theme the device applies to generate haptic effects in response to one or more UI events. Thus, according to the embodiment, the haptic theme framework can provide a standard process for creating haptic themes, installing the haptic themes on the device, and utilizing the haptic themes within the device.

According to an embodiment, a mapping language is used to describe a mapping of a haptic effect to a UI event, where the mapping is stored in a file. In other words, the mapping language is used to create a mapping file. The mapping language is a meta-language used to describe the mapping, and can be used to properly create a mapping file that can be utilized within a haptic theme. As will be described in more detail, the mapping file can be combined with one or more effect files, where an effect file is an output form of a haptic effect designed using a haptic effect design tool, such as MOTIV STUDIO, from IMMERSION CORP., to form a haptic theme. In one embodiment, the mapping language is an Extensible Markup Language ("XML") schema, and the mapping file is an XML file. According to the embodiment, the mapping file is used to build a haptic theme that is based on the mapping, as will be described in greater detail in relation to FIG. 3.

Figure 3:
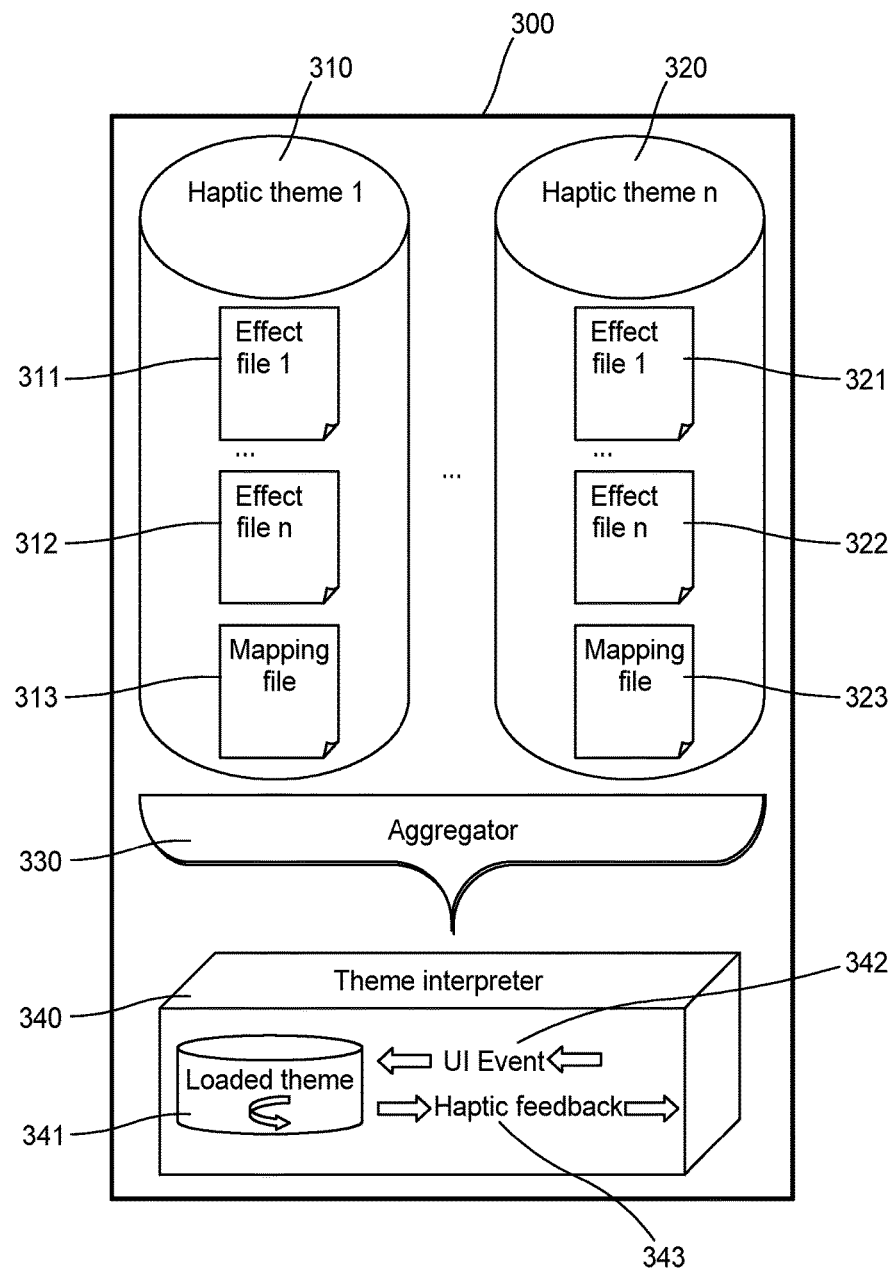
FIG. 3 illustrates a block diagram of a device that includes one or more haptic themes, according to an embodiment of the invention.

FIG. 3 illustrates a block diagram of a device 300 that includes one or more haptic themes, according to an embodiment of the invention. As previously described, a haptic theme is a packaging structure that contains one or more haptic effects and a mapping of the one or more haptic effects to one or more UI events. According to the embodiment, each haptic effect can be contained within a haptic effect file (i.e., effect file), and the mapping can be contained within a mapping file as previously described. Thus, as illustrated in FIG. 3, device 300 includes n haptic themes, identified in FIG. 3 as haptic theme 1 . . . haptic theme n, where n can be any number according to the individual embodiment. For purposes of further discussion, haptic theme 1 is also identified as haptic theme 310, and haptic theme n is also identified as haptic theme 320.

According to the embodiment, a haptic theme, such as haptic theme 310, includes one or more effect files and a mapping file. Thus, as illustrated in FIG. 3, haptic theme 1 includes n effect files, identified in FIG. 3 as effect file 1 . . . effect file n, where n can be any number according to the individual embodiment. For purposes of further discussion, effect file 1 of haptic theme 310 is also identified as effect file 311, and effect file n of haptic theme 310 is also identified as effect file 312. Effect file 311, as previously described, is an output format of a haptic effect design tool, and includes a haptic effect. According to the embodiment, a haptic effect can be designed using a haptic effect design tool, such as MOTIV STUDIO, and then exported to an effect file, such as effect file 311. In one embodiment, effect file 311 is an IMMERSION TOUCHSENSE ("IVT") file. Effect file 311 can also be identified as a component of a haptic theme, or a haptic theme component. According to the embodiment, the above description of effect file 311 applies to each effect file of haptic theme 310, including effect file 312.

Furthermore, haptic theme 310 also include mapping file 313. As previously described, mapping file 313 is created using a mapping language, and is a file that contains a mapping of one or more haptic effects to one or more UI events. According to an embodiment, mapping file 313 contains a mapping of all known UI events that are part of device 300 and the haptic effects defined for the plurality of effect files (including effect file 311 and effect file 312). Thus, the mapping of mapping file 313 maps each haptic effect of each effect file to a UI event of device 300. In one embodiment, the mapping language used to create mapping file 313 is an XML schema, and mapping file 313 is an XML file. Mapping file 313 can also be identified as a component of a haptic theme, or a haptic theme component.

Below is an example of a mapping language used to create a mapping:

```xml
<?xml version="1.0" encoding="UTF-8"?>
<xsd:schema targetNamespace="http://www.immersion.com"
elementFormDefault="qualified" xmlns:xsd="http://www.w3.org/2001/XMLSchema"
xmlns:immr="http://www.immersion.com">
    <xsd:complexType name="UIEvent">
        <xsd:attribute name="type" use="required">
            <xsd:simpleType>
                <xsd:restriction base="xsd:NCName">
                    <xsd:enumeration value="LONG_PRESS" />
                    <xsd:enumeration value="VIRTUAL_KEY"></xsd:enumeration>
                    <xsd:enumeration value="SAFE_MODE_DISABLED"></xsd:enumeration>
                    <xsd:enumeration value="SAFE_MODE_ENABLED"></xsd:enumeration>
                    <xsd:enumeration value="BUTTON_CLICK"></xsd:enumeration>
                    <xsd:enumeration value="BUTTON_PRESS"></xsd:enumeration>
                    <xsd:enumeration value="LISTVIEW_CLICK"></xsd:enumeration>
                    <xsd:enumeration value="LISTVIEW_PRESS"></xsd:enumeration>
                </xsd:restriction>
            </xsd:simpleType>
        </xsd:attribute>
    </xsd:complexType>
    <xsd:complexType name="Effect">
        <xsd:attribute name="id" type="xsd:ID" use="required" />
            <xsd:attribute name="ivtFile" type="xsd:string" use="required">
            </xsd:attribute>
            <xsd:attribute name="effectIndex" type="xsd:int" use="optional"> </xsd:attribute>
            <xsd:attribute name="effectName" type="xsd:string" use="optional"></xsd:attribute>
    </xsd:complexType>
    <xsd:element name="Theme" type="immr:Theme">
    </xsd:element>
    <xsd:complexType name="Theme">
        <xsd:sequence>
            <xsd:element name="Effects" type="immr:Effects"
                    maxOccurs="1" minOccurs="1">
            </xsd:element>
            <xsd:element name="ThemeMapping" type="immr:ThemeMapping"
                    maxOccurs="1" minOccurs="1" />
        </xsd:sequence>
        <xsd:attribute name="name" type="xsd:string" use="required"></xsd:attribute>
        <xsd:attribute name="version" use="required">
            <xsd:simpleType>
                <xsd:restriction base="xsd:string">
                    <xsd:enumeration value="0.1"></xsd:enumeration>
                </xsd:restriction>
            </xsd:simpleType>
        </xsd:attribute>
        <xsd:attribute name="strength" type="xsd:int" use="required"></xsd:attribute>
        <xsd:attribute name="pervasiveness" type="xsd:int" use="required"></xsd:attribute>
    </xsd:complexType>
    <xsd:complexType name="Effects">
        <xsd:sequence>
            <xsd:element name="Effect" type="immr:Effect" maxOccurs="unbounded"
                minOccurs="1"/>
```

```
        </xsd:sequence>
    </xsd:complexType>
    <xsd:complexType name="ThemeMapping">
        <xsd:sequence>
            <xsd:element name="Mapping" type="immr:Mapping" maxOccurs="unbounded"
minOccurs="1"/>
        </xsd:sequence>
    </xsd:complexType>
    <xsd:complexType name="Mapping">
        <xsd:sequence>
            <xsd:element type="immr:UIEvent" name="Event" maxOccurs="1"
                    minOccurs="1"/>
            <xsd:element name="Action" type="immr:Action" maxOccurs="unbounded"
minOccurs="1"></xsd:element>
        </xsd:sequence>
    </xsd:complexType>
    <xsd:complexType name="Action">
        <xsd:sequence>
            <xsd:choice>
                <xsd:element name="StartEffect" type="immr:StartEffect"
                        maxOccurs="1" minOccurs="1">
                </xsd:element>
            </xsd:choice>
        </xsd:sequence>
    </xsd:complexType>
    <xsd:complexType name="StartEffect">
        <xsd:attribute name="id" type="xsd:ID" use="required"></xsd:attribute>
        <xsd:attribute name="effectRef" type="xsd:IDREF"
                    use="required">
        </xsd:attribute>
    </xsd:complexType>
</xsd:schema>
```

In the above example, the complex type UIEvent defines the following UI events: LONG_PRESS, VIRTUAL_KEY, SAFE_MODE_DISABLED, SAFE_MODE_ENABLED, BUTTON_CLICK, BUTTON_PRESS, LISTVIEW_CLICK, and LISTVIEW_PRESS. The complex type Effect defines a haptic effect stored within an effect file. The complex type Mapping maps a UI event to a haptic effect, utilizing the Action and StartEffect complex types. As one of ordinary skill in the art would appreciate, the above example is only an example of a mapping, and a mapping can have a different format, or include different substantive content, and still be within the scope of the invention.

Below is an example of a mapping file that is a component of a haptic theme (i.e., haptic theme component):

```
<?xml version="1.0" encoding="UTF-8"?>
<immr:Theme xmlns:immr="http://www.immersion.com"
        xmlns:xsi="http://www.w3.org/2001/XMLSchema-instance"
        xsi:schemaLocation="http://www.immersion.com
ImmersionTouchSenseAndroidTheme.xsd"
        name="MyNiftyPrettyTheme"
        version="0.1"
        strength="0"
        pervasiveness="0">
    <immr:Effects>
        <immr:Effect id="myClickEffect" ivtFile="/sdcard/effectSet.ivt"
            effectIndex="0" />
        <immr:Effect id="myHDEffect" ivtFile="/sdcard/effectSet.ivt"
effectName="testEffect" />
    </immr:Effects>
    <immr:ThemeMapping>
        <immr:Mapping>
            <immr:Event type="BUTTON_PRESS" />
            <immr:Action>
                <immr:StartEffect id="buttonPressEffectHandle"
effectRef="myClickEffect" />
            </immr:Action>
        </immr:Mapping>
        <immr:Mapping>
            <immr:Event type="BUTTON_CLICK" />
            <immr:Action>
                <immr:StartEffect effectRef="myHDEffect"
id="buttonClickEffectHandle"/>
            </immr:Action>
        </immr:Mapping>
    </immr:ThemeMapping>
</immr:Theme>
```

In the above example, a theme, "MyNiftyPrettyTheme" is defined. Within the "MyNiftyPrettyTheme" theme, two haptic effects, "myclickEffect" and "myHDEffect" are defined. The "myclickEffect" haptic effect is mapped to the UI event, "BUTTON_PRESS," and the "myHDEffect" haptic effect is mapped to the UI event "BUTTON_CLICK." As one of ordinary skill in the art would appreciate, the above example is only an example of a mapping file, and a mapping file can have a different format, or include different substantive content, and still be within the scope of the invention.

Furthermore, haptic theme 310 also include a software layer (not shown) that provides a communication protocol between haptic theme 310 and an OS of device 300. According to the embodiment, this allows haptic theme 310 to communicate, using source code, to the OS of device 300, to indicate which haptic effect is defined for which UI event. Thus, haptic theme 310 is a self-contained theme that can be installed within device 300. A haptic theme, such as haptic theme 310, is described below in greater detail in relation to FIG. 4.

According to the embodiment, the above description of haptic theme 310, applies to each haptic theme of device 300, including haptic theme 320. Thus, the above description of effect file 311 of haptic theme 310 also applies to effect file 321 of haptic theme 320, and the above description of mapping file 313 of haptic theme 310 also applies to mapping file 323 of haptic theme 320.

According to the illustrated embodiment of FIG. 3, device 300 further includes an aggregator 330. According to the embodiment, each haptic theme of device 300 (including haptic theme 310 and haptic theme 320) can advertise itself to aggregator 330 as an available haptic theme. Aggregator 330 can respond to an advertisement of each haptic theme of device 300. In one embodiment, aggregator 330 can respond to an advertisement of a haptic theme by querying the haptic theme and selecting the mapping file and the one or more effect files of the haptic theme. By querying the haptic theme, aggregator 330 can provide the haptic theme to be selected as an active haptic theme within device 300. Aggregator 330 can further query all the haptic themes of a device, and aggregate them, in accordance with the embodiment. In the illustrated embodiment of FIG. 3, aggregator 330 can aggregate all the haptic themes of device 300 (including haptic theme 310 and haptic theme 320). By aggregating all the haptic themes of device 300, aggregator 330 can provide a haptic theme that can be selected by a user of device 300 as an active theme. Furthermore, according to the embodiment, aggregator 330 can dynamically aggregate all the haptic themes of device 300. What is meant by "dynamically aggregate" is that if one or more haptic themes are added to, or deleted from, device 300, aggregator 330 can dynamically update its query and aggregation of the haptic themes, so that aggregator 330 can always provide the current haptic themes of device 300.

According to the illustrated embodiment of FIG. 3, device 300 further includes a theme interpreter 340. In accordance with the embodiment, theme interpreter 340 dynamically loads a haptic theme and uses the haptic theme in real time to generate haptic feedback. More specifically, theme interpreter 340 queries the mapping file and the one or more effect files of a haptic theme that is selected as an active theme, retrieves a mapping from the mapping file and one or haptic effects from the one or more effect files, and stores the mapping and the one or more haptic themes within a memory, or other type of data structure, so that the mapping and the one or more haptic themes can be accessed in real time.

In the illustrated embodiment, theme interpreter 340 includes loaded theme 341, which represents a haptic theme selected from the haptic themes of device 300 (including haptic theme 310 and haptic theme 320), as an active theme. Also illustrated in FIG. 3 is UI event 342, which represents a UI event, as previously defined, and haptic feedback 343, which represents haptic feedback that is generated based on a haptic effect. According to the embodiment, when UI event 342 is communicated to theme interpreter 340, theme interpreter 340 accesses loaded theme 341, stored in the memory, or other data structure, and retrieves a haptic effect that is mapped to UI event 342. Theme interpreter 340 retrieves the haptic effect that is mapped to UI event 342 based on the mapping stored within the memory, or other data structure. Theme interpreter 340 generates haptic feedback 343 based on the retrieved haptic effect, and outputs haptic feedback 343.

Figure 4:
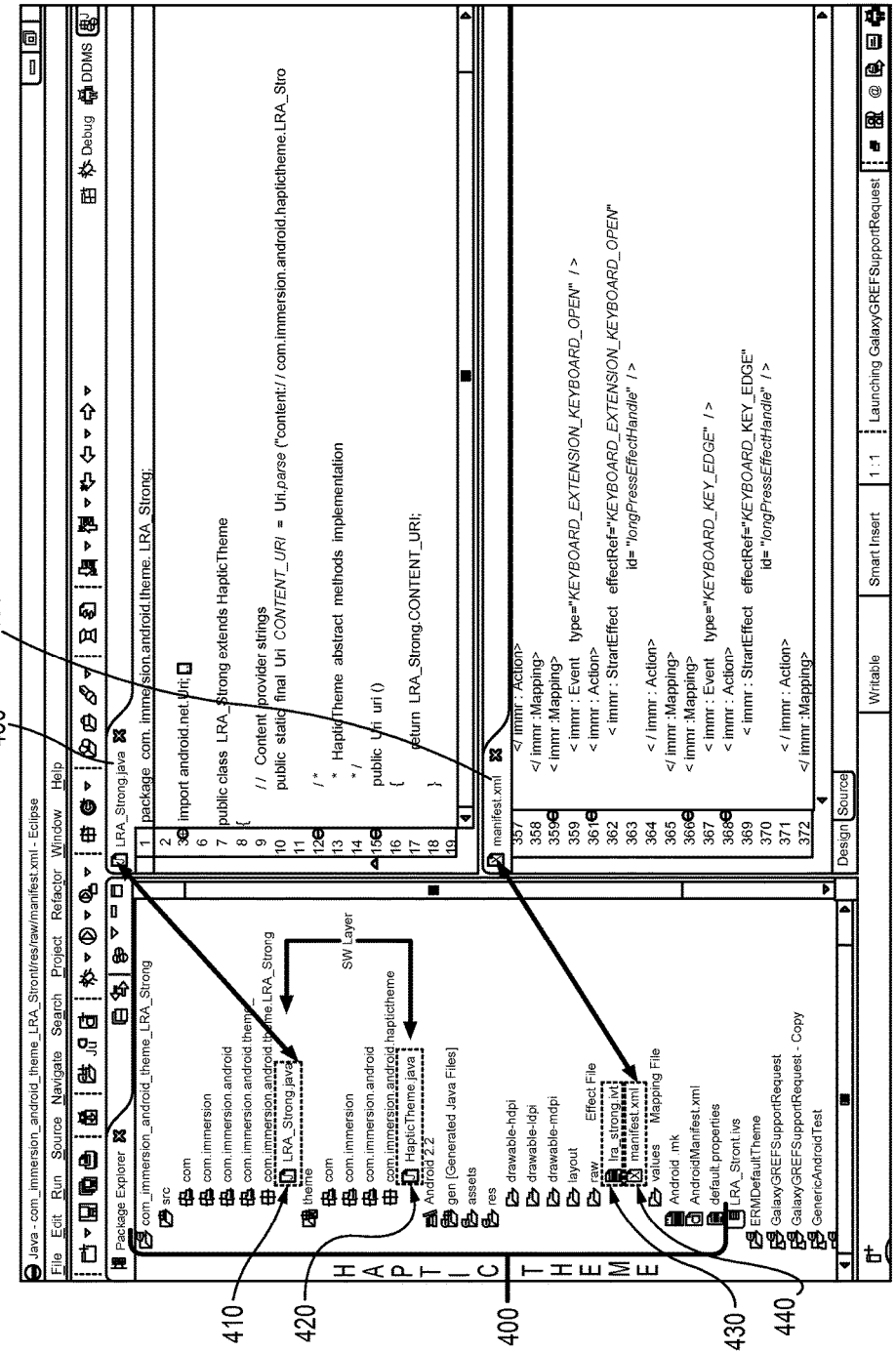
FIG. 4 illustrates an example of a haptic theme, according to an embodiment of the invention.

FIG. 4 illustrates an example of a haptic theme 400, according to an embodiment of the invention. More specifically, FIG. 4 illustrates haptic theme 400, as displayed within a haptic effect design tool, from the viewpoint of a haptic effect developer. In one embodiment, haptic theme 400 is similar to the haptic themes illustrated in FIG. 3 (i.e., haptic theme 310 and haptic theme 320). According to the embodiment, haptic theme 400 includes a plurality of files, including files 410, 420, 430, and 440.

Files 410 and 420 are example software layer files that are part of a software layer of haptic theme 400, where software layer file 410 is an extension of software layer file 420. As previously described, a software layer provides a communication protocol between haptic theme 400 and an OS of a device. In the illustrated embodiment of FIG. 4, a portion of software layer file 410 is displayed within window 450 of the haptic effect design tool. As one of ordinary skill in the art would readily appreciate, this is merely an example portion of software layer file 410, and that software layer file 410 may include different content in other alternate embodiments.

File 430 is an example effect file of haptic theme 400. As previously described, an effect file is an output form of a haptic effect designed using a haptic effect design tool. Thus, according to the embodiment, effect file 430 includes a haptic effect that can be mapped to a UI event. Effect file 430 is effectively packaged within haptic theme 400, in accordance with the embodiment.

File 440 is an example mapping file of haptic theme 400. As previously described, a mapping file is a file that contains a mapping of one or more haptic effects to one or more UI events. Thus, according to the embodiment, mapping file 440 includes a mapping of a haptic effect stored within effect file 430 to a UI event. Mapping file 440 is effectively packaged within haptic theme 400, in accordance with the embodiment. In the illustrated embodiment of FIG. 4, a portion of mapping file 440 is displayed within window 460 of the haptic effect design tool. As one of ordinary skill in the art would readily appreciate, this is merely an example portion of mapping file 460, and that mapping file 460 may include different content in other alternate embodiments.

Figure 5:
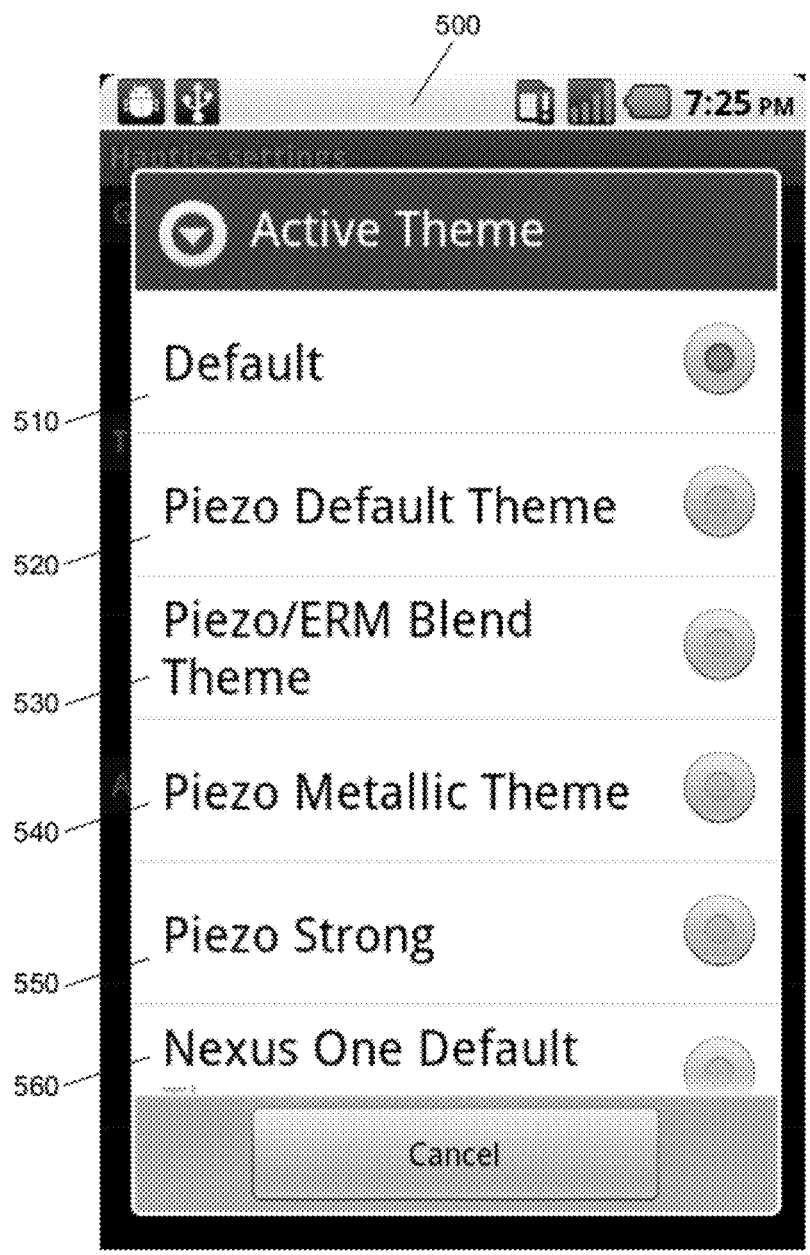
FIG. 5 illustrates an example of a user interface that displays one or more haptic themes based on an aggregator according to an embodiment of the invention.

FIG. 5 illustrates an example of a user interface 500 that displays one or more haptic themes based on an aggregator according to an embodiment of the invention. According to the embodiment, user interface 500 displays a list of available haptic themes (i.e., haptic themes 510, 520, 530, 540, 550, and 560), where each haptic theme contains its own haptic effects, and its own mapping of haptic effects to UI events. According to the embodiment, an aggregator can be utilized to display the list of available haptic themes, as previously described in relation to FIG. 3. In one embodiment, haptic themes 510, 520, 530 540, 540, 550, and 560 are similar to the haptic themes illustrated in FIG. 3 (i.e., haptic theme 310 and haptic theme 320), and the haptic theme illustrated in FIG. 4 (i.e., haptic theme 400), in one embodiment. A user can utilize user interface 500 to select one of haptic themes 510, 520, 530, 540, 550, and 560 as an active haptic theme. Once a user selects one of haptic themes 510, 520, 530, 540, 550, and 560 as an active haptic theme, the active haptic theme is utilized to generate haptic feedback in response to a UI event based on a mapping of a haptic effect to the UI event, as previously described in relation to FIG. 3.

Thus, in one embodiment of the invention, a haptic theme system can display one or more haptic themes within a user interface, where each haptic theme includes one or more haptic effects and a mapping that maps the one or more haptic effects to one or more UI events using a mapping language. The haptic theme system can then receive a selection of a haptic theme, where the haptic theme is one of the one or more haptic themes displayed within the user interface. Upon receiving the selection, the selected haptic theme can be utilized to generate haptic feedback. More specifically, the haptic theme system can receive a UI event and generate haptic feedback based on the haptic effect that is mapped to the UI event within the mapping of the haptic theme.

Figure 6:
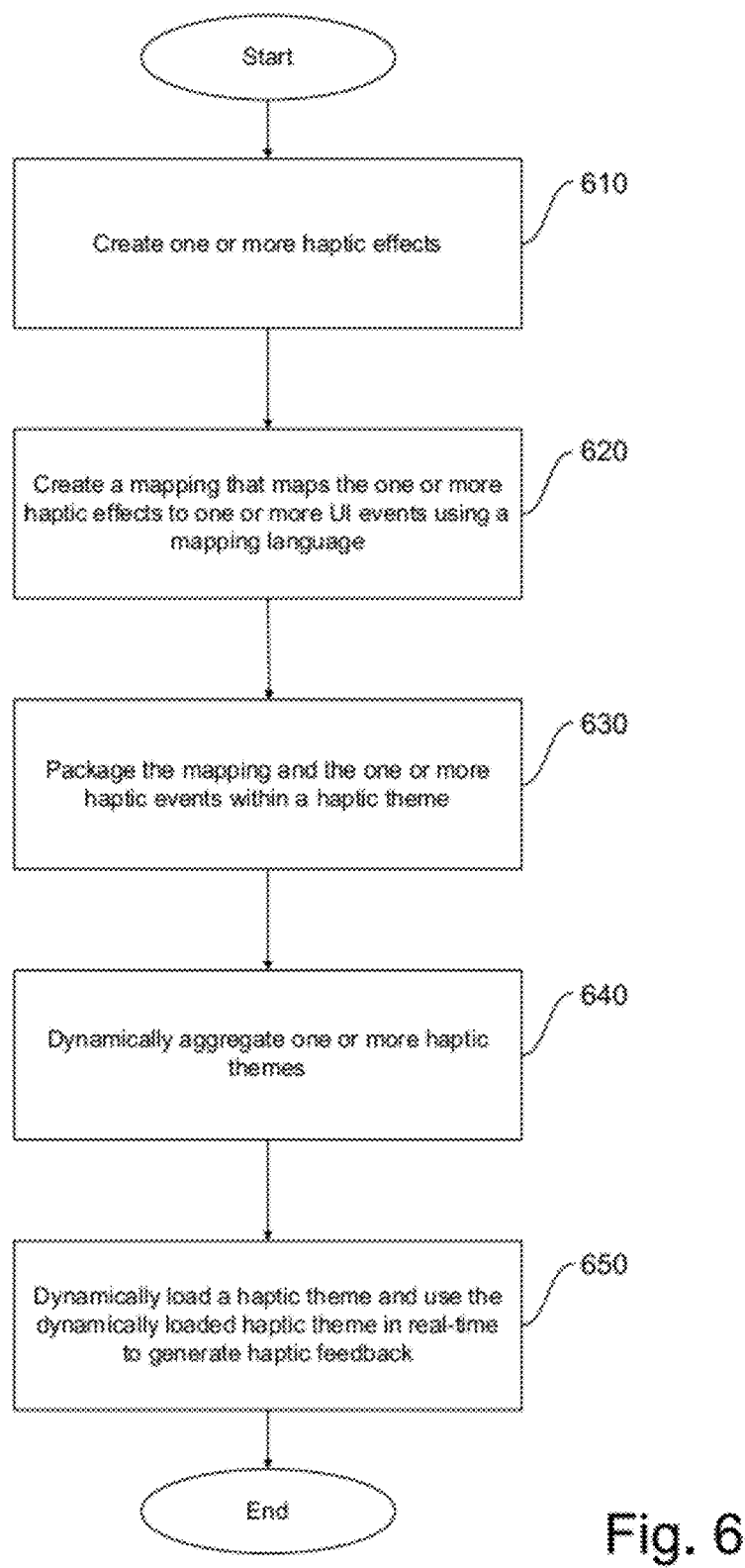
FIG. 6 illustrates a flow diagram of the functionality of a haptic theme module, according to an embodiment of the invention.
Figure 8:
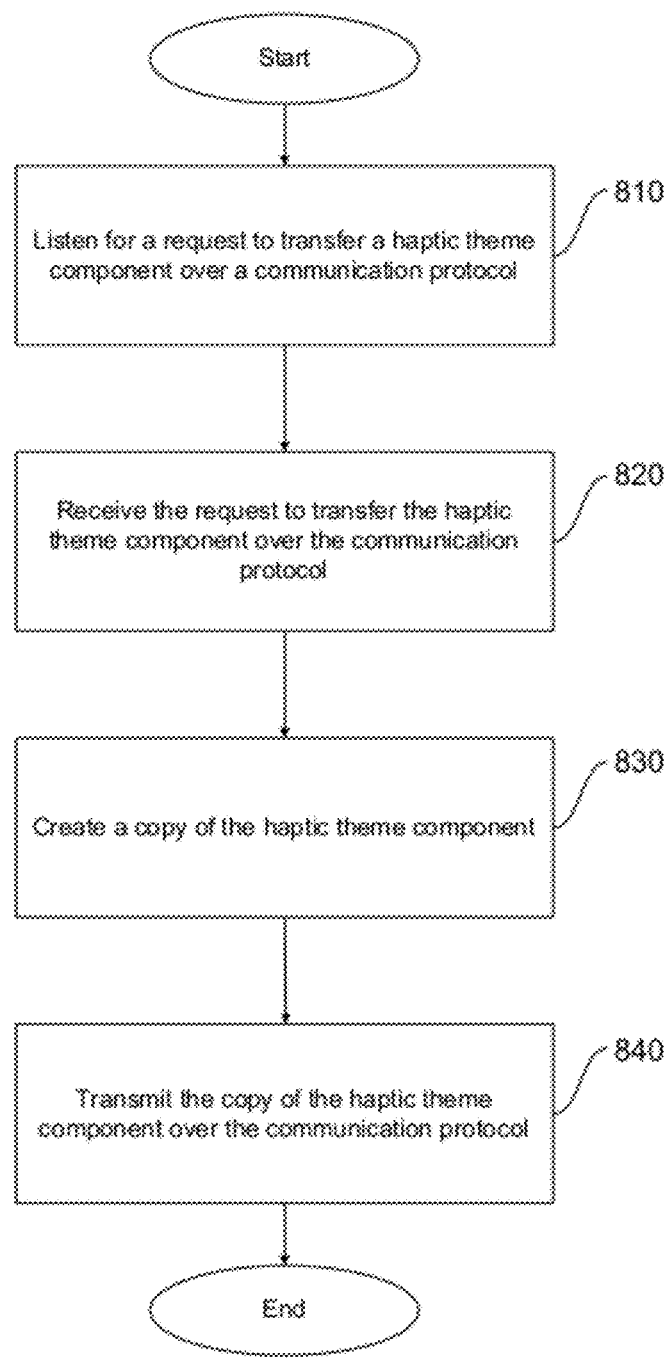
FIG. 8 illustrates another flow diagram of the functionality of a haptic theme module, according to an embodiment of the invention.
Figure 10:
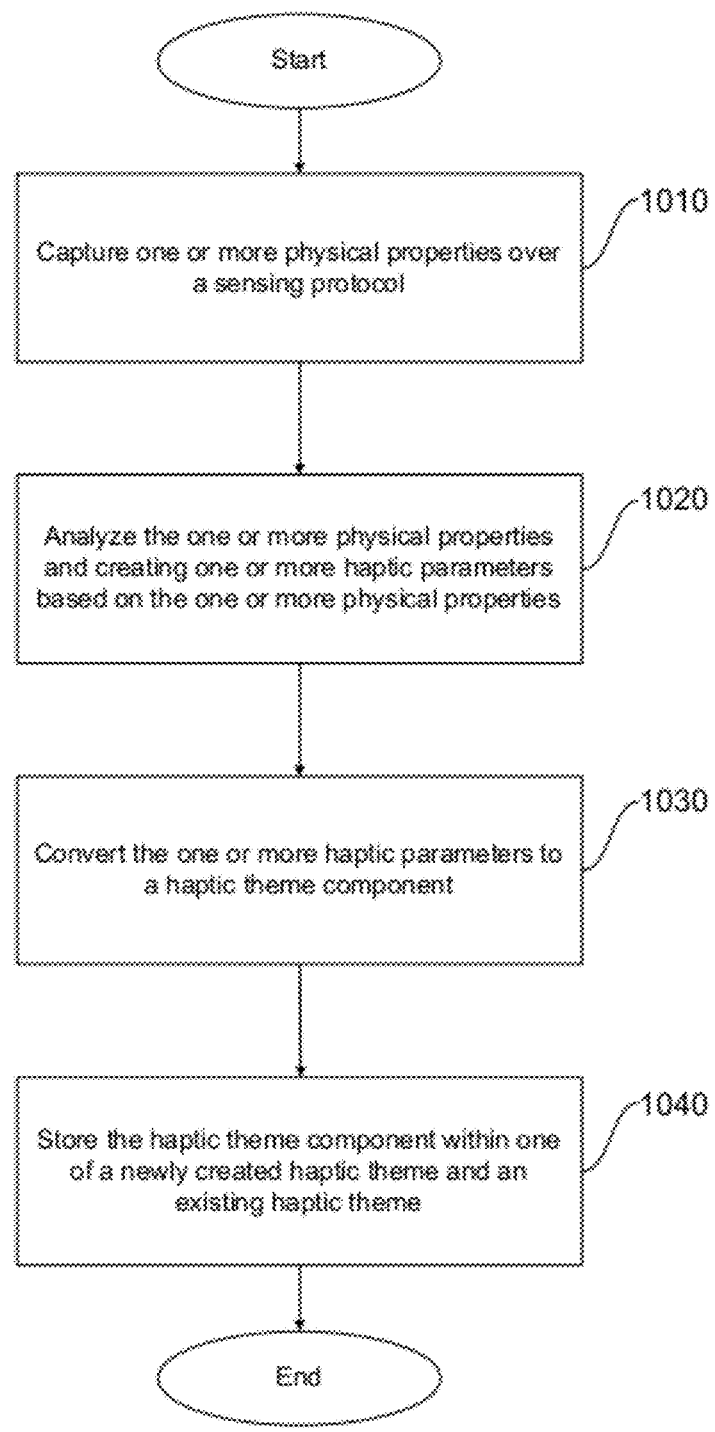
FIG. 10 illustrates another flow diagram of the functionality of a haptic theme module, according to an embodiment of the invention.

FIG. 6 illustrates a flow diagram of the functionality of a haptic theme module, according to an embodiment of the invention. In one embodiment, the functionality of the flow diagram of FIG. 6, and the functionality of the flow diagrams of FIGS. 8 and 10, are implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

At 610, one or more haptic effects are created. In one embodiment, the one or more haptic effects can be created by a haptic effect design tool. Also, in one embodiment, each haptic effect is stored within an effect file. The effect file can be an IVT file, in accordance with one embodiment.

At 620, a mapping is created that maps the one or more haptic effects to one or more UI events using a mapping language. In one embodiment, one or more UI events are known for a device, and a haptic effect of the one or more haptic effects can be mapped to each UI event, so that when the UI event occurs within the device, the corresponding haptic effect is triggered. In one embodiment, the mapping is created using the mapping language. Also, in one embodiment, the mapping is stored within a mapping file. The mapping file can be an XML file, where the mapping language is an XML schema, in accordance with one embodiment.

At 630, the mapping and the one or more haptic effects are packaged within a haptic theme. According to the embodiment, the haptic theme is a packaging structure that contains one or more haptic effects and a mapping of the one or more haptic effects to one or more UI events. In accordance with one embodiment, the haptic theme can be an installable package that can be installed on a device. In accordance with another embodiment, the haptic theme can be a package that is integrated with an OS of a device The haptic theme can also include a software layer that provides a communication protocol between the haptic theme and an OS of the device that the haptic theme is installed upon, in one embodiment.

At 640, one or more haptic themes are dynamically aggregated. According to the embodiment, the one or more haptic themes can be haptic themes that are installed on the device. In one embodiment, the one or more haptic themes include the created haptic theme. The dynamically aggregating the one or more haptic themes can include presenting the one or more haptic themes within a user interface of the device in one embodiment. In this embodiment, a user can select a haptic theme from the one or more haptic themes presented within the user interface as an active haptic theme for the device. Because the aggregation of the one or more haptic themes is dynamic, if one or more haptic themes are added to, or deleted from, the device, the aggregation of the one or more haptic themes can be dynamically updated so that the current haptic themes that are installed on the device are displayed within the user interface of the device.

At 650, a haptic theme is dynamically loaded, and the dynamically loaded haptic theme is used in real-time to generate haptic feedback. According to the embodiment, the dynamically loaded haptic theme receives a UI event. The dynamically loaded haptic theme then identifies a haptic effect that is mapped to the UI event based on the mapping of the dynamically loaded haptic theme. The dynamically loaded haptic theme then generates the haptic feedback based on the identified haptic effect. The dynamically loaded haptic theme can do all these operations in real-time based on the mapping.

Figure 7:
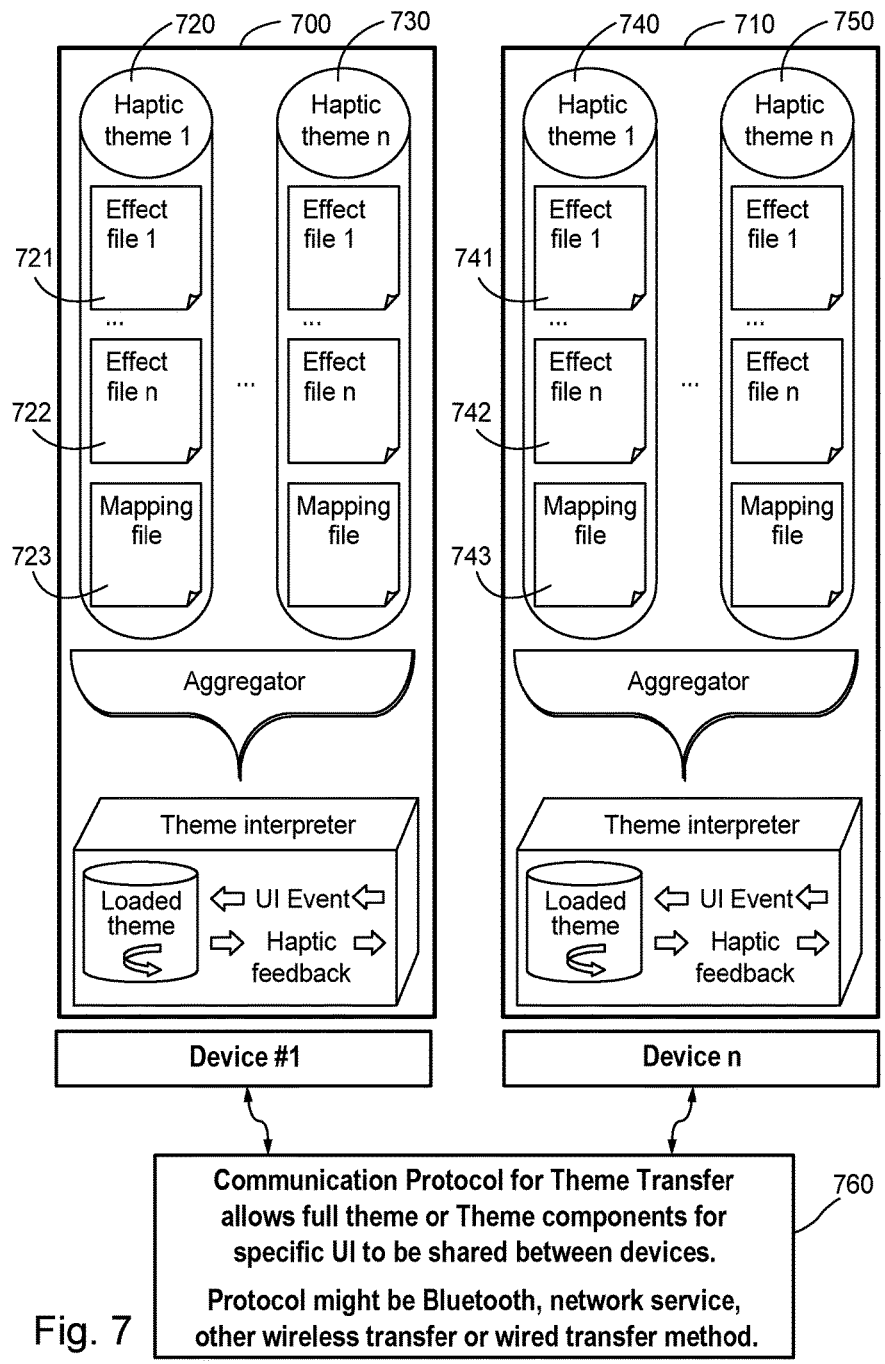
FIG. 7 illustrates a block diagram of a device that transfers a haptic theme, or a haptic theme component, to another device, according to an embodiment of the invention.

FIG. 7 illustrates a block diagram of a device 700 that transfers a haptic theme, or a haptic theme component, to another device 710, according to an embodiment of the invention. Device 700 is also identified in FIG. 7 as device 1, and device 710 is also identified in FIG. 7 as device n. While the illustrated embodiment of FIG. 7 includes two devices, there can be n devices in alternate embodiments, where n is any number. In one embodiment, devices 700 and 710 are similar to device 300 of FIG. 3.

As illustrated in FIG. 7, device 700 and device 710 both include n haptic themes, identified in FIG. 7 as haptic theme 1 . . . haptic theme n, where n can be any number according to the individual embodiment. For purposes of further discussion, haptic theme 1 of device 700 is also identified as haptic theme 720, haptic theme n of device 700 is also identified as haptic theme 730, haptic theme 1 of device 710 is also identified as haptic theme 740, and haptic theme n of device 710 is also identified as haptic theme 750.

According to the embodiment, device 700 can share a haptic theme component with device 710 by transmitting a copy of the haptic theme component to device 710. As previously described, a haptic theme component is at least a portion of a haptic theme. In one embodiment, a haptic theme component is a haptic effect. In another embodiment, a haptic theme component is a mapping. In another embodiment, a haptic theme component is a combination of a haptic effect and a mapping. Thus, in one embodiment, where the haptic theme is haptic theme 720, a haptic theme component can be effect file 721, effect file 722, mapping file 733, or any combination therein.

In one embodiment, device 700 can listen for a request to transfer a haptic theme component. According to the embodiment, device 700 can listen for the request over communication protocol 760. Communication protocol 760 can be any communication protocol that is known to one of ordinary skill in the art that allows for the transfer of data from one device to another device. Some example communication protocols include a Bluetooth protocol, an Ethernet protocol, an optical fiber protocol, a Local Area Network ("LAN") protocol, a wireless LAN protocol, a Universal Serial Bus ("UBS") protocol, or other wired transfer protocol or wireless transfer protocol. In accordance with the embodiment, device 700 can receive the request to transfer the haptic theme component over communication protocol 760. In one embodiment, device 700 can receive the request from device 710.

Once device 700 receives the request to transfer a haptic theme component, device 700 can identify the haptic theme component within the appropriate haptic theme of device 700, and create a copy of the haptic theme component. For example, if device 710 requests device 700 to transfer effect file 721 of haptic theme 720, device 700 can identify effect file 721, and create a copy of effect file 721. Device 700 can subsequently transmit the copy of effect file 721 to device 710 over communication protocol 760.

In one embodiment, once device 710 receives the copy of the haptic theme component, device 710 can create a new haptic theme and store the copy of the haptic theme component within the newly created haptic theme. In the above example, when device 710 receives the copy of effect file 721, device 710 can create a new haptic theme within device 710, store the copy of effect file 721 within the newly created haptic theme, creating a mapping file for the newly created haptic theme, and map the haptic effect stored within the copy of the effect file 721 to a UI event. In one embodiment, the haptic effect stored within the copy of effect file 721 can be mapped to the same UI event that the haptic effect stored within effect file 721 was mapped to within mapping file 723.

In another embodiment, once device 710 receives the copy of the haptic theme component, device 710 can store the copy of the haptic theme component within an existing haptic theme. In the above example, when device 710 receives the copy of effect file 721, device 710 can store the copy of effect file 721 within haptic theme 740, for example, which is an existing haptic theme within device 710. According to the embodiment, once the copy of effect file 721 is stored within haptic theme 740, mapping file 743 can be updated to map the haptic effect stored within the copy of effect file 721 to a UI event. In one embodiment, the haptic effect stored within the copy of effect file 721 can be mapped to the same UI event that the original haptic effect stored within effect file 721 was mapped to.

In one embodiment, device 710 can request that device 700 transfer an entire haptic theme, rather than a haptic component. In this embodiment, device 700 can identify the haptic theme of device 700, and create a copy of the haptic theme, including all of the effect files and a mapping file of the haptic theme. For example, if device 710 requests device 700 to transfer haptic theme 720, device 700 can identify haptic theme 720, and create a copy of haptic theme 720. Device 700 can subsequently transmit the copy of haptic theme 720 to device 710 over communication protocol 760.

In one embodiment where device 700 transmits a copy of a haptic theme to device 710, device 710 can store the copy of the haptic theme as a new haptic theme within device 710. In the above example, device 710 can store a copy of haptic theme 720 as a new haptic theme within device 710 (not shown in FIG. 7), wherein the new haptic theme include all the effect files and the mapping file of the original haptic theme of device 700 (i.e., haptic theme 720). In an alternate embodiment where device 700 transmits a copy of a haptic theme to device 710, device 710 can store the copy of the haptic theme within an existing haptic theme. In this embodiment, device 710 can overwrite all the effect files and the mapping file of the existing haptic theme within device 710 and replace them with the effect files and mapping file of the copy of the haptic theme. In the above example, device 710 can store a copy of haptic theme 720 within haptic theme 740, for example, by overwriting effect files 741 and 742, and mapping file 743, and replacing them with effect files 721 and 722, and mapping file 723.

FIG. 8 illustrates another flow diagram of the functionality of a haptic theme module, according to an embodiment of the invention. In one embodiment, at the start of the flow illustrated in FIG. 8, the flow illustrated in FIG. 6 has been performed, and at least one haptic theme has been created. At 810, a request to transfer a haptic theme component is listened for over a communication protocol. In one embodiment, a haptic theme component includes at least a portion of a haptic theme. At 820, the request to transfer the haptic theme component is received over the communication protocol. At 830, a copy of the haptic theme component is created. At 840, the copy of haptic theme component is transmitted over the communication protocol. In one embodiment, the communication protocol is one of, a Bluetooth protocol, an Ethernet protocol, an optical fiber protocol, a LAN protocol, a wireless LAN protocol, and a UBS protocol.

In one embodiment, the request to transfer the haptic theme component is received from a device, and the copy of the haptic theme component is transmitted to the device. In one embodiment, where the copy of the haptic theme component is transmitted to the device, the device creates a new haptic theme and stores the copy of the haptic theme component within the newly created haptic theme. In another embodiment, where the copy of the haptic theme component is transmitted to the device, the device stores the copy of the haptic theme component within an existing haptic theme of the device.

In one embodiment, the request received from the device is a request to transfer a haptic theme, and the haptic theme is transmitted to the device. In one embodiment, where the copy of the haptic theme is transmitted to the device, the device stores the copy of the haptic theme as a new haptic theme. In another embodiment, where the copy of the haptic theme is transmitted to the device, the device stores the copy of the haptic theme as an existing haptic theme of the device.

Figure 9:
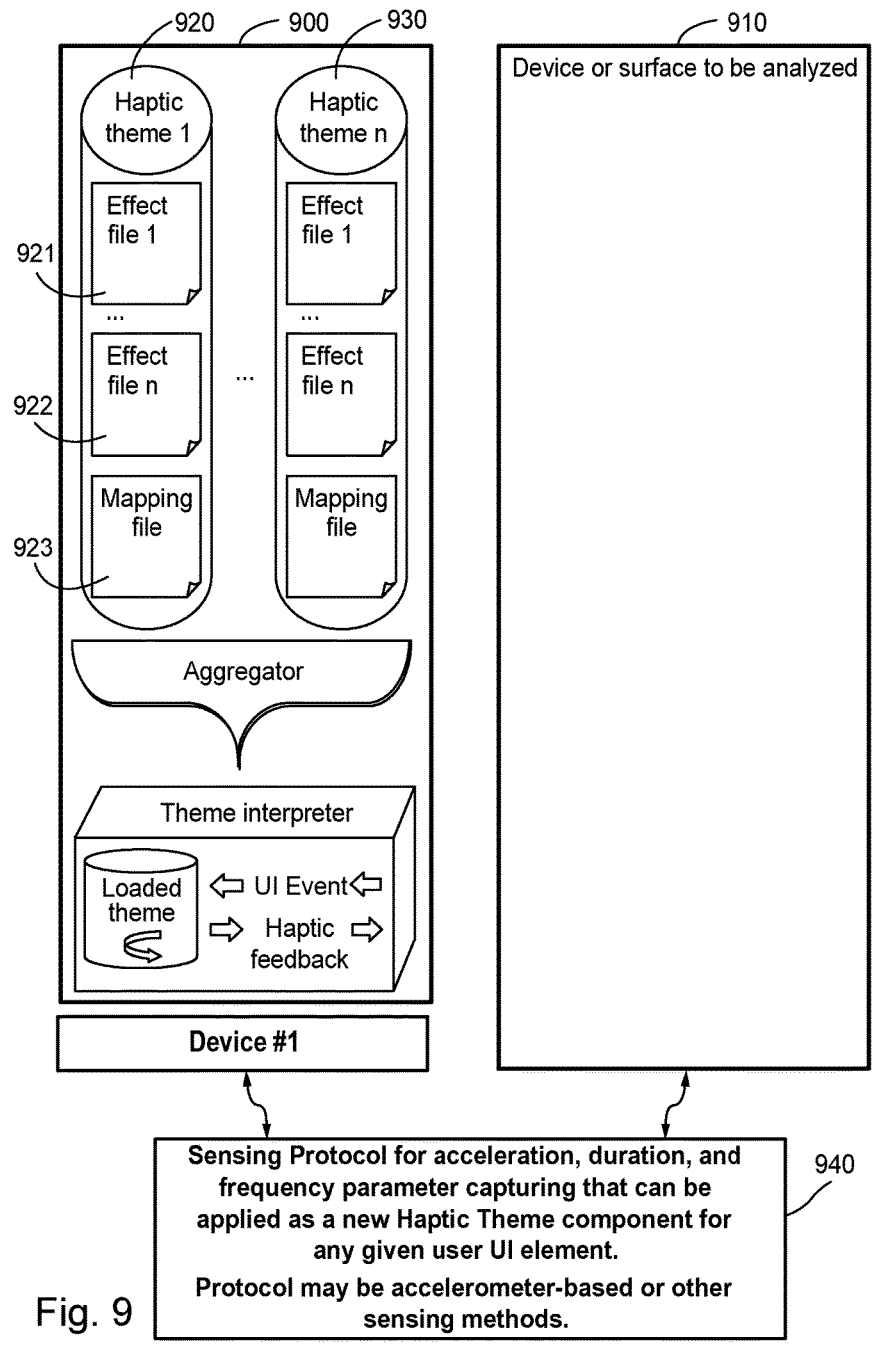
FIG. 9 illustrates a block diagram of a device that analyzes and captures one or more physical properties and converts the one or more physical properties into a haptic theme component within the device.

FIG. 9 illustrates a block diagram of a device 900 that analyzes and captures one or more physical properties and converts the one or more physical properties into a haptic theme component within device 900. Device 900 is also identified in FIG. 9 as device 1. In one embodiment, device 900 is similar to device 300 of FIG. 3.

As illustrated in FIG. 9, device 900 includes n haptic themes, identified in FIG. 9 as haptic theme 1 . . . haptic theme n, where n can be any number according to the individual embodiment. For purposes of further discussion, haptic theme 1 of device 900 is also identified as haptic theme 920, and haptic theme n of device 900 is also identified as haptic theme 930.

FIG. 9 also includes device/surface 910. In one embodiment, device/surface 910 is a device that can produce an action that includes one or more physical properties. Examples of such devices include telephones or mobile phones, where one or more physical properties can include one or more physical properties of a vibration that is produced by device/surface 910. In one embodiment, device/surface 910 is a device that is similar to device 300 of FIG. 3. In another embodiment, device/surface 910 is a surface that includes one or more physical properties. Examples of such surfaces include a wooden surface, a granite surface, a metal surface, and a fabric surface, where the physical properties can include texture, surface area, friction, or another type of physical property.

In one embodiment, device 900 can capture one or more physical properties of device/surface 910. In another embodiment, device 900 can capture one or more physical properties of an action that is produced by device/surface 910. In accordance with an embodiment, device 900 includes one or more sensors configured to detect and capture stimuli, such as one or more physical properties. In one embodiment, the one or more sensors are accelerometers. As understood by one of ordinary skill in the art, an accelerometer can be configured to detect and capture one or more physical properties, such as a change in acceleration. In one embodiment, device 900 can capture one or more physical properties of device/surface 910, or one or more physical properties of an action that is produced by device/surface 910 over a sensing protocol 940. In one embodiment, sensing protocol 940 can be an accelerometer-based protocol. In other embodiment, sensing protocol 940 can be another type of sensing protocol that is known to one of ordinary skill in the art.

According to the embodiment, device 900 can analyze the one or more physical properties captured. The analysis of the one or more physical properties can include the creation of one or more haptic parameters based on the one or more physical properties. As readily appreciated by one of ordinary skill in the art, a haptic parameter is a quantity of a haptic effect quality, such as pressure, frequency, duration, and amplitude (i.e., strength). A haptic effect can be composed of one or more haptic parameters.

According to the embodiment, device 900 can convert the one or more haptic parameters created by analyzing one or more physical properties into a haptic theme component. As previously described, a haptic theme component is at least a portion of a haptic theme. In one embodiment, a haptic theme component is a haptic effect. In another embodiment, a haptic theme component is a mapping. In another embodiment, a haptic theme component is a combination of a haptic effect and a mapping. Thus, in one embodiment, where the haptic theme is haptic theme 920, a haptic theme component can be effect file 921, effect file 922, mapping file 933, or any combination therein. In accordance with the embodiment, the conversion can include creating a haptic effect based on the one or more haptic parameters. In one embodiment, the conversion can further include creating a mapping that maps the haptic effect to a UI event.

FIG. 10 illustrates another flow diagram of the functionality of a haptic theme module, according to an embodiment of the invention. In one embodiment, at the start of the flow illustrated in FIG. 10, the flow illustrated in FIG. 6 has been performed, and at least one haptic theme has been created. At 1010, one or more physical properties are captured over a sensing protocol. In one embodiment, the one or more physical properties include one or more physical properties of an object. Examples of such objects include a wooden surface, a stone surface, a metal surface, or a fabric surface. In another embodiment, the one or more physical properties may include one or more physical properties of an action produced by a device. An example of such an action is a vibration of a device. In one embodiment, a sensing protocol is an accelerometer-based protocol.

At 1020, the one or more physical properties are analyzed and one or more haptic parameters are created based on the one or more physical properties. In one embodiment, haptic qualities of the one or more physical properties are analyzed in order to create one or more haptic parameters. Thus, the one or more haptic parameters represents the haptic qualities of the one or more physical properties.

At 1030, the one or more haptic parameters are converted to a haptic theme component. In one embodiment, a haptic theme component is a haptic effect. In another embodiment, a haptic theme component is a mapping. In another embodiment, a haptic theme component is a combination of a haptic effect and a mapping. In one embodiment, the conversion can include creating a haptic effect based on the one or more haptic parameters. In another embodiment, the conversion can further include creating a mapping that maps the haptic effect to a UI event.

At 1040, the haptic theme component is stored. In one embodiment, the haptic theme component is stored within a newly created haptic theme. In another embodiment, the haptic theme component is stored within an existing haptic theme.

Thus, according to an embodiment, a haptic theme system can encapsulate a set of custom-defined haptic effects within a haptic theme, where each haptic effect can be mapped to a UI event. The haptic theme can then be imported, exported, or installed on a device, allowing a user to customize the set of haptic effects that can be produced by the device based on one or more UI events. This can allow haptic effect developers outside of OEMs, as well as device users, to develop and customizes haptic effects for devices even after the devices have been released and sold to users.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to provide a haptic theme framework, the instructions comprising:
creating one or more haptic effect definitions;
storing each haptic effect definition of the one or more haptic effect definitions within an effect file;
creating a mapping that maps the one or more haptic effect definitions to one or more user interface events, wherein the mapping is described according to a mapping language;
storing the mapping within a mapping file;
packaging the mapping file and the one or more effect files within a haptic theme, wherein the haptic theme comprises the mapping file, the one or more effect files, and a software layer file that provides a communication protocol between the haptic theme and an operating system of a device to output a haptic effect in response to a user interface event based on the mapping file and the at least one effect file;
dynamically aggregating a plurality of haptic themes comprising the haptic theme;
wherein the dynamically aggregating further comprises dynamically updating the aggregation of the plurality of haptic themes where one or more haptic themes are added or deleted;
selecting the haptic theme from the plurality of haptic themes as an active haptic theme;
creating a haptic theme component from the haptic theme, wherein the haptic theme component comprises at least one effect file of the one or more effect files and the mapping file, and wherein the creating the haptic theme component comprises packaging the at least one effect file and the mapping file within the haptic theme component;
transmitting the haptic theme component to the device;
capturing one or more physical properties over a sensing protocol;
analyzing the one or more physical properties and creating one or more haptic parameters based on the one or more physical properties;
converting the one or more haptic parameters to a new haptic effect definition; and
creating a new haptic theme comprising a new effect file that comprises the new haptic effect definition and a new mapping file that comprises a new mapping that maps the new haptic effect definition to a user interface event.

2. The non-transitory computer-readable medium of claim 1, wherein the dynamically aggregating the plurality of haptic themes comprises presenting the plurality of haptic themes within a user interface of a device.

3. The non-transitory computer-readable medium of claim 1, the instructions further comprising dynamically loading a haptic theme and generating haptic feedback effects in real-time based on the dynamically loaded haptic theme,
wherein the dynamically loaded haptic theme receives a user interface event, identifies a haptic effect definition that corresponds to the user interface event based on the mapping, and generates a haptic feedback effect based on the haptic effect definition.

4. The non-transitory computer-readable medium of claim 1, the instructions further comprising:
listening for a request to transfer the haptic theme component over a communication protocol;
receiving the request to transfer the haptic theme component over the communication protocol from a device;
creating a copy of the haptic theme component; and
transmitting the copy of the haptic theme component over the communication protocol to the device.

5. The non-transitory computer-readable medium of claim 4, wherein the device creates a new haptic theme and stores the copy of the haptic theme component within the new haptic theme.

6. The non-transitory computer-readable medium of claim 4, wherein the device stores the copy of the haptic theme component within an existing haptic theme of the device.

7. The non-transitory computer-readable medium of claim 4, wherein the haptic theme component comprises all the effect files and the mapping file of the haptic theme.

8. The non-transitory computer-readable medium of claim 1, the instructions further comprising storing the new haptic effect definition within an existing haptic theme.

9. The non-transitory computer-readable medium of claim 1, wherein the mapping language comprises an extensible markup language schema, and wherein the mapping file comprises an extensible markup language file.

10. A computer-implemented method for providing a haptic theme framework, the computer-implemented method comprising:
creating, by a processor, one or more haptic effect definitions;
storing, by the processor, each haptic effect definition of the one or more haptic effect definitions within an effect file;
creating, by the processor, a mapping that maps the one or more haptic effect definitions to one or more user interface events, wherein the mapping is described according to a mapping language;
storing, by the processor, the mapping within a mapping file;
packaging, by the processor, the mapping file and the one or more effect files within a haptic theme, wherein the haptic theme comprises the mapping file, the one or more effect files, and a software layer file that provides a communication protocol between the haptic theme and an operating system of instructs a device to output a haptic effect in response to a user interface event based on the mapping file and the at least one effect file;
dynamically aggregating, by the processor, a plurality of haptic themes comprising the haptic theme;
wherein the dynamically aggregating further comprises dynamically updating, by the processor, the aggregation of the plurality of haptic themes where one or more haptic themes are added or deleted
selecting, by the processor, the haptic theme from a plurality of haptic themes as an active haptic theme;
creating a haptic theme component from the haptic theme, wherein the haptic theme component comprises at least one effect file of the one or more effect files and the mapping file, and wherein the creating the haptic theme component comprises packaging the at least one effect file and the mapping file within the haptic theme component;
transmitting the haptic theme component to the device;
capturing one or more physical properties over a sensing protocol;
analyzing the one or more physical properties and creating one or more haptic parameters based on the one or more physical properties;
converting the one or more haptic parameters to a new haptic effect definition; and
creating, by the processor, a new haptic theme comprising a new effect file that comprises the new haptic effect definition and a new mapping file that comprises a new mapping that maps the new haptic effect definition to a user interface event.

11. The computer-implemented method of claim 10, further comprising dynamically loading a haptic theme and generating haptic feedback effects in real-time based on the dynamically loaded haptic theme,
wherein the dynamically loaded haptic theme receives a user interface event, identifies a haptic effect definition that corresponds to the user interface event based on the mapping, and generates a haptic feedback effect based on the haptic effect definition.

12. The computer-implemented method of claim 10, further comprising:
listening for a request to transfer the haptic theme component over a communication protocol;
receiving the request to transfer the haptic theme component over the communication protocol from a device;
creating a copy of the haptic theme component; and
transmitting the copy of the haptic theme component over the communication protocol to the device.

13. A haptic theme system comprising:
a memory configured to store a haptic theme module;
a processor configured to execute the haptic theme module stored on the memory;
an actuator configured to generate a haptic feedback effect; and
a sensor configured to detect one or more stimuli;
wherein the processor is further configured, when executing the haptic theme module stored on the memory, to cause the haptic theme system to:

display a plurality of haptic themes within a user interface, wherein a haptic theme comprises one or more effect files that each comprise a haptic effect definition, and a mapping file that comprises a mapping that maps the one or more haptic effect definitions to one or more user interface events, wherein the mapping is described according to a mapping language, wherein the haptic theme further comprises a software layer file that provides a communication protocol between the haptic theme and an operating system of a device to output a haptic effect in response to a user interface event based on the mapping file and the one or more effect files;

dynamically update the display of the plurality of haptic themes where one or more haptic themes are added or deleted;

receive a selection of a first haptic theme, wherein the first haptic theme is one of the plurality of haptic themes;

select the first haptic theme from the plurality of haptic themes as an active haptic theme;

receive a user interface event;

generate the haptic feedback effect based on the haptic effect definition that is mapped to the user interface event within the mapping;

create a haptic theme component from the first haptic theme, wherein the haptic theme component comprises at least one effect file of the one or more effect files and the mapping file and the at least one effect file and the mapping file is packaged within the haptic theme component;

transmit the haptic theme component to the device;

capture one or more physical properties over a sensing protocol using the sensor;

analyze the haptic event and create one or more haptic parameters based on the one or more physical properties;

convert the one or more haptic parameters to a haptic effect definition; and create a new haptic theme comprising a new effect file that comprises a new haptic effect definition and a new mapping file that comprises a new mapping that maps the new haptic effect definition to a user interface event.

14. The haptic theme system of claim 13, further comprising:

a communication device configured to transmit and receive data from a device, wherein the processor is further configured, when executing the haptic theme module stored on the memory, to cause the haptic theme system to:

listen for a request to transfer the haptic theme component over a communication protocol;

receive the request to transfer the haptic theme component over the communication protocol from a device;

create a copy of the haptic theme component; and transmit the copy of the haptic theme component over the communication protocol to the device.

* * * * *